United States Patent [19]

Mueller et al.

[11] Patent Number: 4,912,293

[45] Date of Patent: Mar. 27, 1990

[54] METHOD AND APPARATUS FOR FORMING A PARTIAL PROTECTIVE-GAS ATMOSPHERE

[75] Inventors: Ewald Mueller, Neunkirchen; Reinhard Teig, Forcheim, both of Fed. Rep. of Germany

[73] Assignee: Siemens Aktiengesellschaft, Munich, Fed. Rep. of Germany

[21] Appl. No.: 246,973

[22] Filed: Sep. 20, 1988

[30] Foreign Application Priority Data

Sep. 21, 1987 [DE] Fed. Rep. of Germany ....... 3731729

[51] Int. Cl.⁴ ............................................. B23K 9/16
[52] U.S. Cl. .................................. 219/74; 219/60 R; 219/136
[58] Field of Search ............ 219/72, 60 R, 60.2, 219/61, 136, 74

[56] References Cited

U.S. PATENT DOCUMENTS

| | | |
|---|---|---|
| 2,805,315 | 9/1957 | Chapman ............................ 219/72 |
| 3,736,400 | 5/1973 | Spiegel et al. . |
| 3,994,429 | 11/1976 | Hallenbeck et al. . |

FOREIGN PATENT DOCUMENTS 2578957 9/1986 France .
60-227975 11/1985 Japan .................................... 219/72

*Primary Examiner*—Clifford C. Shaw
*Attorney, Agent, or Firm*—Herbert L. Lerner; Laurence A. Greenberg

[57] ABSTRACT

In a vessel, two tubes are mutually spaced apart by a given distance, are to be welded together at ends of the tubes, are accessible with difficulty or not at all, and one of them is introduced into the vessel through an opening in a wall of the vessel. A method and apparatus for forming a partial protective-gas atmosphere for the two tubes includes a sheath brought to a welding location through one of the tubes or through the opening for the tube in the wall of the vessel. Both of the tube ends are overlapped with the sheath or one of the tube ends is overlapped with the sheath and the sheath is placed above the opening in the wall of the vessel for the other tube. This forms a chamber about the welding location. The two tube ends are subsequently pushed toward each other until only a slight intermediate space remains therebetween. A protecive gas is subsequently introduced into the chamber through the intermediate space. The tubes are subsequently centered in a desired position for welding.

13 Claims, 7 Drawing Sheets

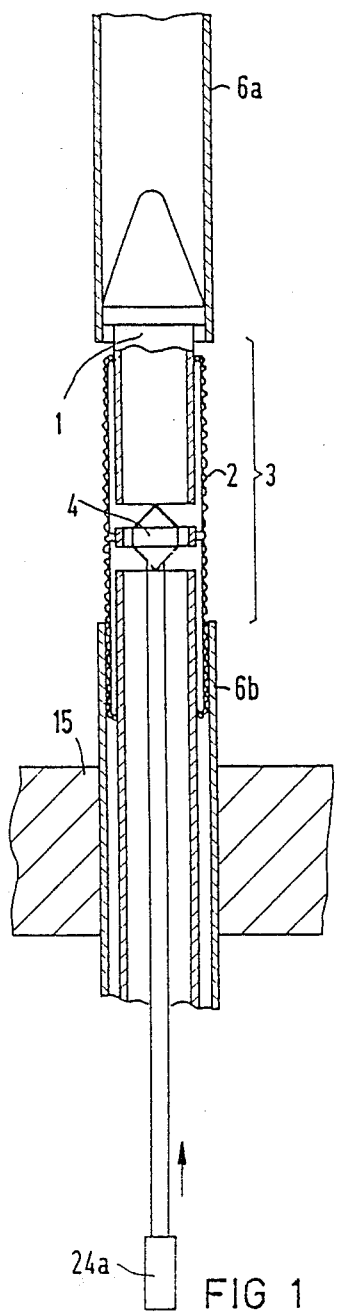
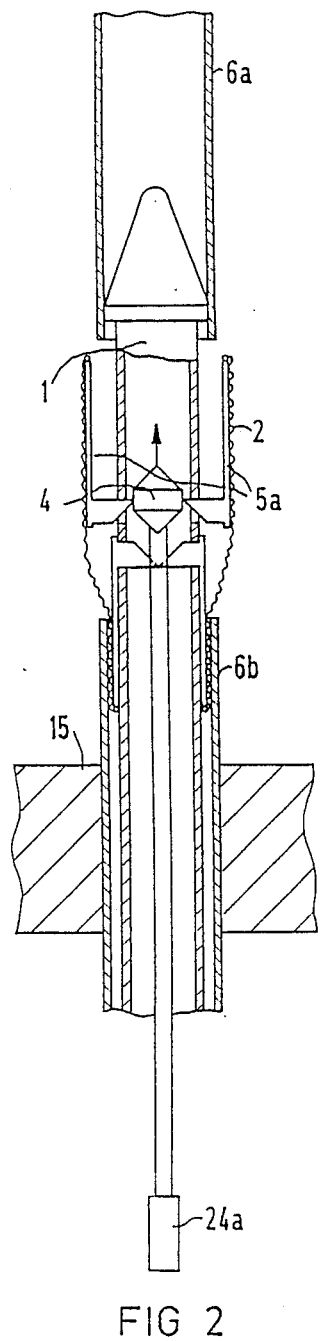
FIG 1
FIG 2

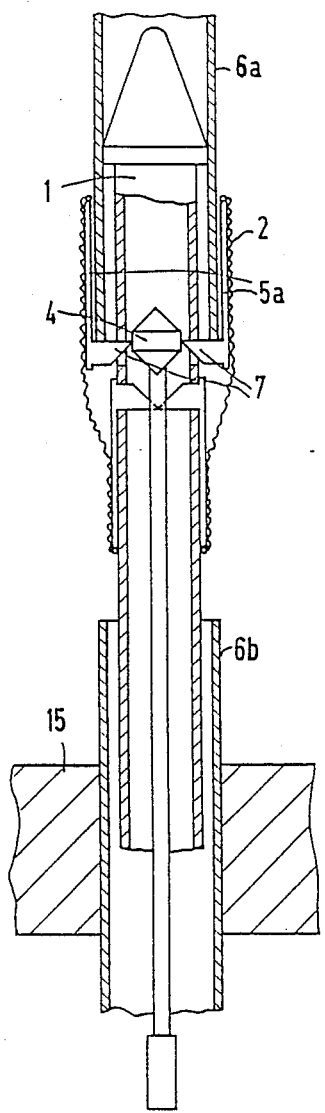
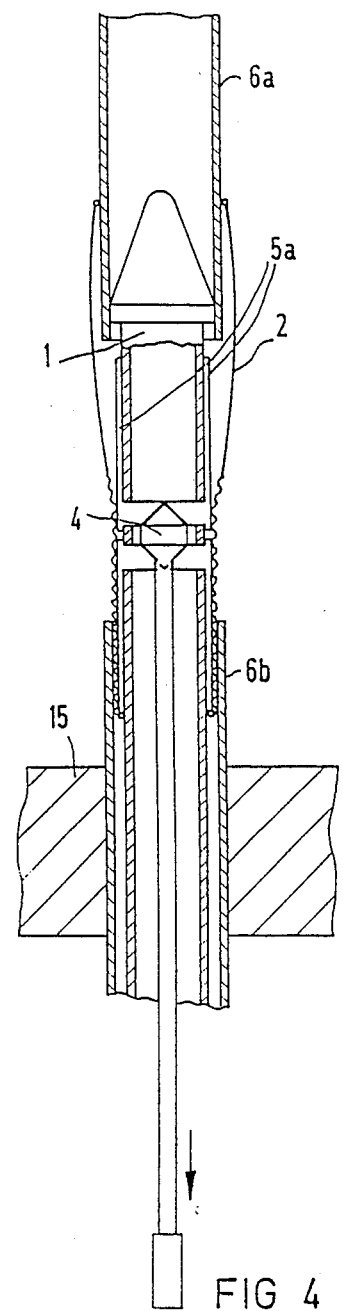
FIG 3
FIG 4

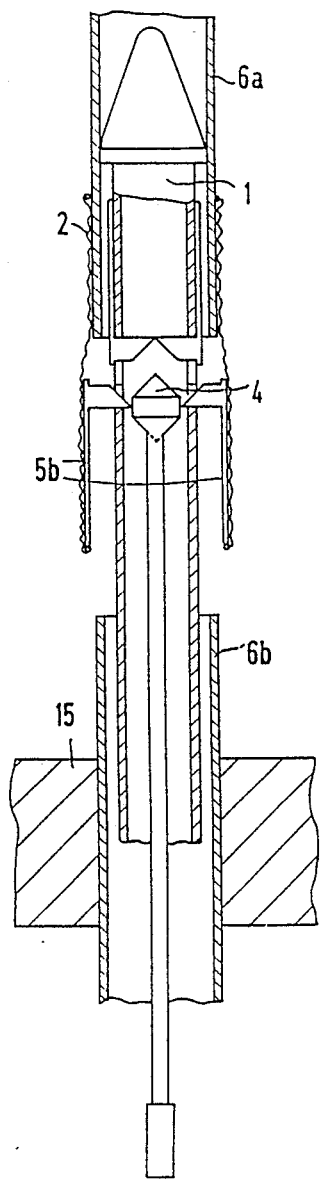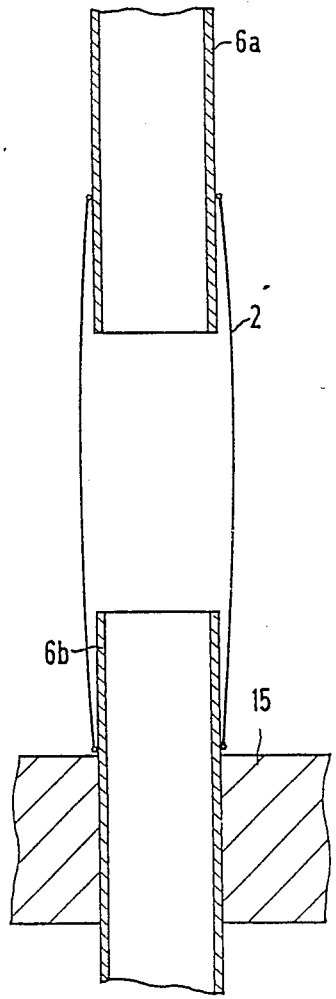
FIG 5
FIG 6

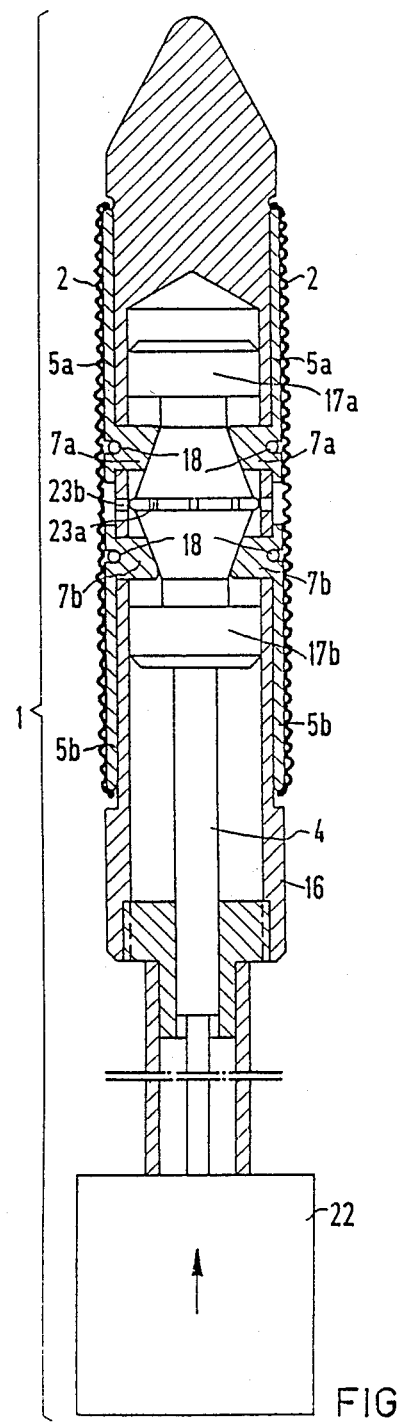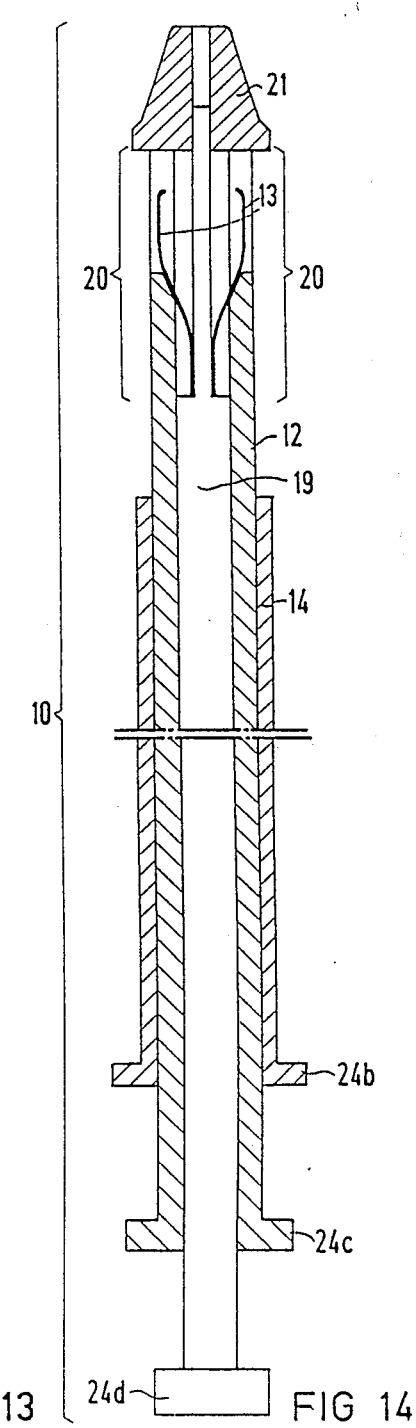

METHOD AND APPARATUS FOR FORMING A PARTIAL PROTECTIVE-GAS ATMOSPHERE

The invention relates to a method and apparatus for forming a partial protective-gas atmosphere for two tubes which are disposed at a defined distance from one another in a vessel, especially a heat exchanger, which are to be welded together at the ends thereof, which are inaccessible or accessible with difficulty, and one of which is introduced into the vessel through an opening in a wall.

When heat exchangers are repaired, in other words when an old tube end is removed and a new one is installed, the entire volume of the secondary side of the heat exchanger must be filled with protective gas, so that the necessary protective-gas atmosphere is established. For this purpose it is necessary to flush out the heat exchanger volume on the secondary side several times. Furthermore, measures are also necessary for furnishing the required protective gas quality, such as pre-evacuation, sealing openings, fitting connections, furnishing a comprehensive protective gas supply system, and so forth. Additionally, the moisture content must be limited, which further increases expenses because it requires an additional drying system. There is no way at all to prevent soiling of the region of the weld seam by deposits (dust) during such an operation.

It is accordingly an object of the invention to provide a method and apparatus for forming a partial protective-gas atmosphere, which overcomes the hereinafore-mentioned disadvantages of the heretofore-known methods and devices of this general type and which forms a partial protective-gas atmosphere of the required quality in an outer region of two tubes that are to be welded together at the ends thereof, the region being accessible only with difficulty or not at all.

With the foregoing and other objects in view there is provided, in accordance with the invention, in combination with a vessel, especially a heat exchanger, in which two tubes are mutually spaced apart by a given distance, are to be welded together at ends of the tubes, are accessible with difficulty or not at all, and one of which is introduced into the vessel through an opening in a wall of the vessel, a method for forming a partial protective-gas atmosphere for the two tubes, which comprises bringing a sheath to a welding location through one of the tubes or through the opening for the tube in the wall of the vessel; overlapping both of the tube ends with the sheath or overlapping one of the tube ends with the sheath and placing the sheath above the opening in the wall of the vessel for the other tube, forming a chamber about the welding location: subsequently pushing the two tube ends toward each other until only a slight intermediate space remains therebetween; subsequently introducing protective gas into the chamber through the intermediate space; and subsequently centering the tubes in a desired position for welding.

The method according to the invention is distinguished by a considerably shorter repair time, reduced consumption of protective gas, and a protective effect on the weld seam. The additional provisions otherwise required for preparing the secondary portion can be dispensed with.

In accordance with another mode of the invention, there is provided a method which comprises forming the sheath of a water-soluble material. The sheath is dissolved by filling the secondary circuit or loop with water, which is already an operational necessity in heat exchangers. Thus no special method for dissolving or removing the sheath is needed.

In accordance with a further mode of the invention, there is provided a method which comprises forming the sheath of a plastic film of polyvinyl alcohol (such as that available commercially under the name MOWIOL or LONZA PVAL film). This material is distinguished by properties that have long proved advantageous in welding, as well as by its property of being environmentally acceptable, because it is degradable by dissolving. The film material facilitates the formation of hose-like inflatable chambers.

In accordance with an added mode of the invention, there is provided a method which comprises forming the sheath of a cellulose polymer combination (such as that available commercially under the name DISSOLVO insulating paper).

Besides the advantage of residue-free dissolution, this paper material can be preshaped by suitable folding, so that the chamber it will form will be of the desired shape. Therefore in accordance with an additional mode of the invention, there is provided a method which comprises forming the sheath with a substantially cylindrical shape.

With the objects of the invention in view, there is also provided, in combination with a vessel, especially a heat exchanger, in which two tubes are mutually spaced apart by a given distance, are to be welded together at ends of the tubes, are accessible with difficulty or not at all, and one of which is introduced into the vessel through an opening in a wall of the vessel, an apparatus for forming a partial protective-gas atmosphere for the two tubes, comprising a sheath; a tubular basic body for emplacing the sheath, the basic body having a periphery and an outside diameter being smaller than the smallest inside diameter of the two tubes to be welded together; and a deployment device for the sheath being disposed on the periphery of the basic body.

This makes it possible to move the sheath to the intended welding location and deploy it even in regions of the tube that are not manually accessible.

In accordance with yet another feature of the invention, the tubular basic body has first and second ends, an outer surface, and openings formed therein; the deployment device includes a longitudinally displaceable adjusting piston disposed axially in the basic body, the adjusting piston having a first end and having a second end with a conical portion; linear drive means are disposed on the first end of the adjusting piston for actuating the adjusting piston: extensible latches forming the expansion device axially contact the outer surface of the basic body and have a groove formed therein; cams are radially disposed on the latches and rest upon the conical portion of the adjusting piston through the openings in the basic body: and springs are annularly disposed on the periphery of the basic body in the groove formed in the latches: whereby the latches are moved radially outwardly for overlapping the tubes in both axial directions by actuation of the adjusting piston. Flexible tubular sheaths can thus securely and simply overlap two tube end.

In accordance with a concomitant feature of the invention, the tubular basic body has first and second ends and a longitudinal groove formed therein: the deployment device is formed of extensible radially outwardly resilient expanding springs disposed on the first end of the basic body in the longitudinal groove which expand toward the first end: a tubular adjusting tube longitudinally surrounds the basic body and presses the spreading springs into the longitudinal groove upon longitudinal movement toward the first end of the basic body: and a tubular positioning tube longitudinally surrounds the adjusting tube.

This device enables reliable disposition of a sheath with a minimum of effort and it is distinguished by its particularly simple and sturdy structure.

Other features which are considered as characteristic for the invention are set forth in the appended claims.

Although the invention is illustrated and described herein as embodied in a method and apparatus for forming a partial protective-gas atmosphere, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 1-8 are fragmentary, diagrammatic, longitudinal-sectional views of an apparatus illustrating the method steps according to the invention wherein a tube is to be attached to a tube;

FIG. 13 is a diagrammatic, longitudinal-sectional view of a configuration having a deployment device in the form of latches; and FIG. 14 is a diagrammatic, longitudinal-sectional view of a configuration having a deployment device in the form of expanding springs.

Figure 7:
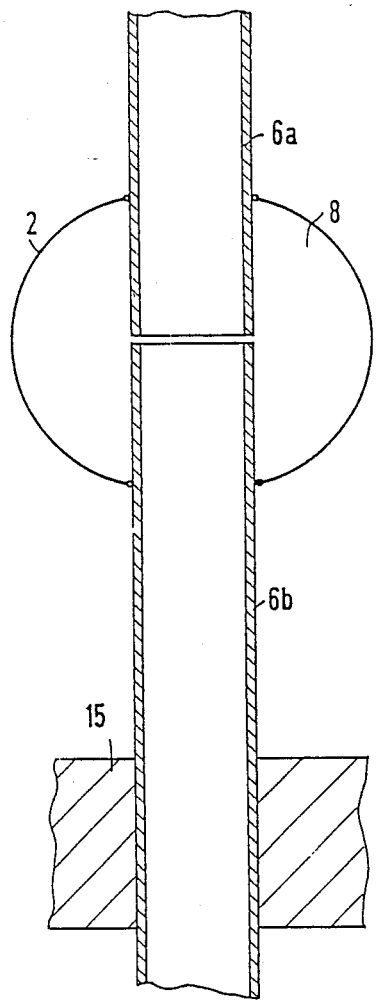

Referring now to the figures of the drawing in detail and first, particularly, to FIG. 1 thereof, it is seen that for the repair of a steam generator heating tube, the tube is separated from the inside above the point having the defect and is removed through a bottom 15. After the end surface of a tube end 6a remaining in the heat exchanger is machined, a new tube 6b to be inserted is introduced into the heat exchanger bottom 15 leaving to a defined spacing 3 between the two tubes.

According to FIG. 1, a tool 1 of a configuration shown in more detail in FIG. 13, is guided along with a sheath 2 disposed on the outside of the tool 1, through the new tube 6b to be inserted into the intermediate space 3 between the two tubes 6a, 6b.

According to FIG. 2, due to the advancement of an adjusting piston 4, an upper latch or clamp 5a in the form of a flat surface which has the sheath 2 wrapped around it, is pressed outward to a size larger than the outside diameter of the tube. In the illustrated embodiment of the tool 1, a manual actuation of the adjusting piston 4 is provided by means of a handle 24a.

According to FIG. 3, due to the advancement of the entire tool 1 until it meets the tube 6a at radial cams 7, the latches 5a with the sheath 2 wrapped around them overlap the tube end 6a. By slightly retracting the adjusting piston 4 with the handle 24a, the expansion of the sheath 2 is reduced in such a way that the reinforced edge thereof is retained on the tube end 6a. By retraction of the entire tool 1, the latches 5a, which are resting tightly against the tube 6a, are moved into position between the tubes 6a, 6b.

According to FIG. 4, the retraction of the adjusting piston 4 causes the upper latch 5a to return to its inward position.

The process is the same for securing the sheath 2 to the second tube end 6b.

According to FIG. 5, a lower latch or clamp 5b in the form of a flat surface is moved into position between the two tube segments 6a, 6b. By retraction of the adjusting piston 4 to a lower stop, the latches 5b are moved radially outward along with the sheath 2 and then overlap the second tube end 6b due to the retraction of the tool 1. It is thus seen that a deployment device for the sheath 2 is formed of elements 4, 4a, 5b and 7.

According to FIG. 6, once the sheath 2 is retained on the second tube end 6b, the tool 1 can be removed from the vicinity of the tubes.

According to FIG. 7, the tubes 6a, 6b are pushed together, except for a small distance required for the introduction of protective gas. It is possible to flush the interior with protective gas during the process of pushing the tubes together. At the same time, this spreads out the sheath 2, producing the desired protective gas chamber 8.

Figure 8:
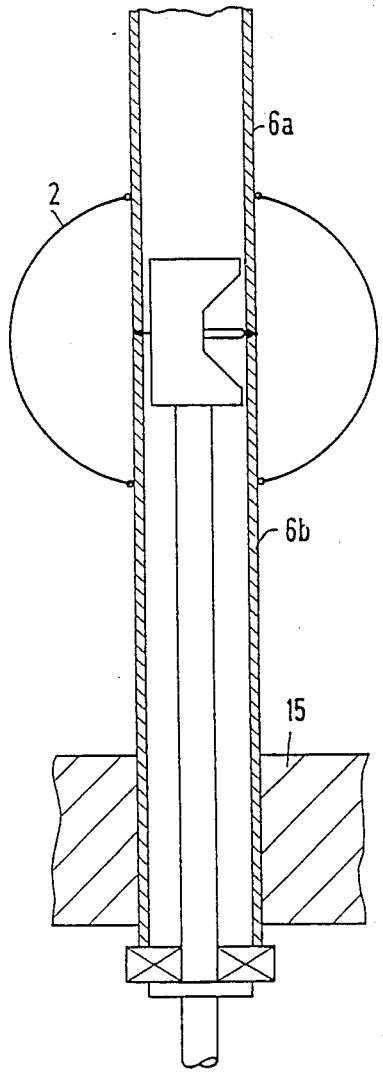

According to FIG. 8, once the desired protective-gas atmosphere has been established, the tubes 6a, 6b are pushed together and centered for the ensuing welding operation. No particular provisions are necessary for the removal of the sheath 2 once the welding operation has been performed, because the sheath 2 is water-soluble. The operational step of filling of the heat exchanger with water, which is necessary, dissolves the sheath 2 without residue.

FIGS. 9-12 illustrate the method steps for use for a welding location in the immediate vicinity of a bottom. For this purpose, a tool 10 which is shown in FIG. 1 and described in greater detail below, is used.

Figure 9:
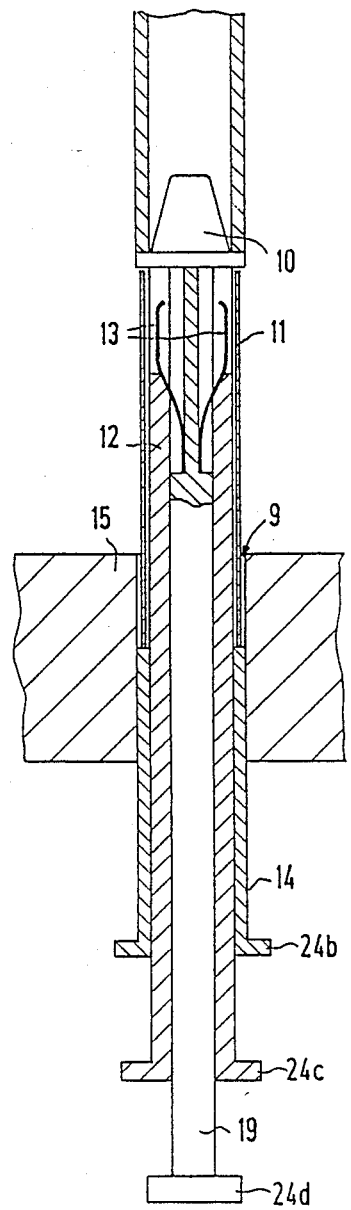
FIGS. 9-12 are views similar to FIGS. 1-8 illustrating the method steps according to the invention wherein a tube is to be attached to a bottom.

According to FIG. 9, a tool 10 is used to introduce a folded cellulose-based sheath 77 into the vessel or container through an opening 9 in a heat exchanger bottom 15, through which a defective piece of tube has been removed. The tool 10 has handles 24b, c, d for manual actuation of an adjusting tube 12, a positioning tube 14 and a basic body 19.

Figure 10:
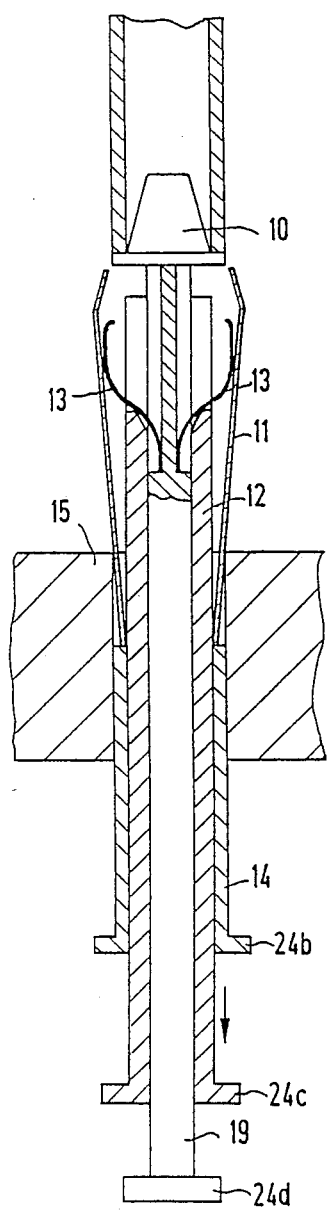

According to FIG. 10, by displacement of the adjusting tube 12, expanding springs 13 are deployed outward, with the sheath 11 wrapped around them.

Figure 11:
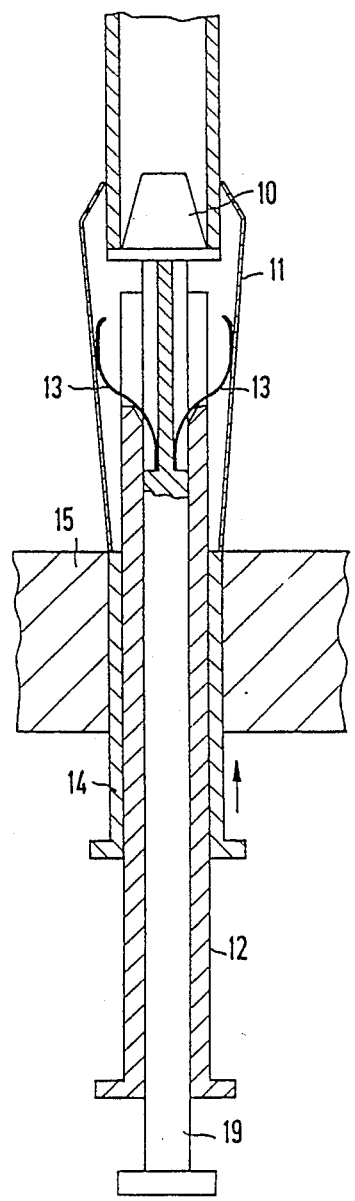

According to FIG. 11, the expanded sheath 11 can be slipped over the tube end 6a by means of the positioning tube 14. The sheath 11 overlaps the end until it is located entirely within the vessel.

Figure 12:
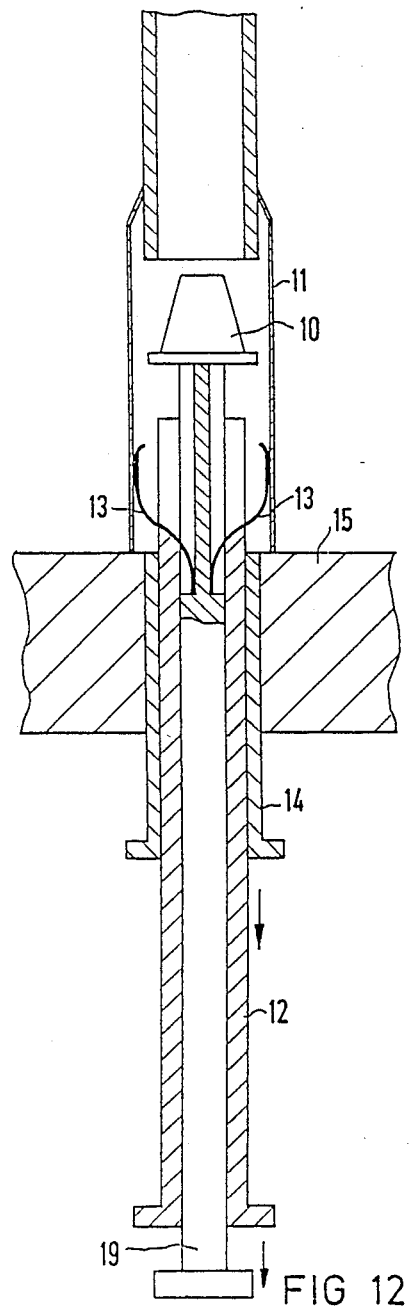

According to FIG. 12, by retraction of the tool 10 with the deployed spreading springs 13, the sheath 11 is expanded uniformly over its entire length and is pushed tightly against the bottom 15. Displacing the adjusting tube 12 once again makes the spreading springs 13 contract again, after which the tool 10 can be removed from the work area. It is thus seen that a deployment device for the sheath 11 is formed of elements 12 and 13. This is followed by the flushing of the chamber with protective gas. Since the sheath is intrinsically not tight, the gas mixture still present can escape into the space surrounding the sheath.

Subsequently, the tube 6b is introduced and the centering thereof required for welding takes place. Since the sheath 11 is soluble in water, once again no further operation or means for removal of the sheath need be provided. The sheath dissolves automatically and without residue after the steam generator is filled with water for operation.

In FIG. 13, the configuration including the tool 1 having the deploying device in the form of latches or clamps is shown. A tubular basic body 16 is provided with an indentation on the outer surface thereof, in which the latches or clamps 5a, 5b are disposed with radially inwardly protruding cams 7a, 7b thereof resting on a conical portion of the adjusting piston 4. The adjusting piston 4 is longitudinally displaceable by pneumatic or electromagnetic drive means 22. The latches 5a, 5b serve as stops for piston bodies 17a, 17b in both directions. However, as shown in FIGS. 1-8, the adjusting piston 4 may also be actuated by hand. If the adjusting piston 4 is moved in one direction, one latch 5a, 5b runs onto the conical portion of the adjusting piston 4 and will be deployed outward. Upon the return of the adjusting piston 4, springs 18 provided in the latches 5a, 5b effect the retraction of the latches 5a, 5b into the initial position. The adjusting piston 4 and the basic body 16 are provided with openings 23a, 23b. On one hand, upon insertion of the sheath 2, the sheath 2 can be retained tightly on the tool 1 by means of negative pressure. On the other hand, protective gas for flushing can already be introduced while the sheath is being deployed.

In FIG. 14, the configuration including the tool 10 having the deploying device in he form of spreading springs is shown in further detail. The movable adjusting tube 12 i disposed on the tubular basic body 19. The expanding springs 13 are secured in grooves 20 in the basic body 19 and pressed outward, they can be pressed back again by the retraction of the adjusting tube 12 into the tool, and they are thus retracted into the grooves 20 of the basic body 19. A tip 21 of the tool may be constructed in such a way that it can be placed against a tube end like a plug. The movable positioning tube 14 surrounds the adjusting tube 12. This embodiment is equipped with the handles 24a, b, c on the tubes 14, 12 and on the basic body 19, respectively, for manual actuation. However, drive means may be provided instead.

We claim:

1. Method for forming a partial protective-gas atmosphere for two tubes which are mutually spaced apart by a given distance, are to be welded together at ends of the tubes, are accessible with difficulty or not at all, and one of which is introduced into a vessel through an opening in a wall of the vessel, which comprises bringing a sheath to a welding location through one of the tubes; spreading out of the sheath at the welding location; overlapping both of the tube ends with the sheath forming a chamber about the welding location; subsequently pushing the two tube ends toward each other until only a slight intermediate space remains therebetween; subsequently introducing protective gas into the chamber through the intermediate space; and subsequently centering the tubes in a desired position for welding.

2. Method according to claim 1, which comprises forming the sheath of a water-soluble material 3. Method according to claim 1, which comprises forming the sheath from a plastic film of polyvinyl alcohol.

4. Method according to claim 1, which comprises forming the sheath from a cellulose-polymer combination.

5. Method according to claim 1, which comprises forming the sheath with a substantially cylindrical shape.

6. Method for forming a partial protective-gas atmosphere for two tubes which are mutually spaced apart by a given distance, are to be welded together at ends of the tubes, are accessible with difficulty or not at all, and one of which is introduced into a vessel through an opening in a wall of the vessel, which comprises bringing a sheath to a welding location through the opening for the tube in the wall of the vessel; spreading out the sheath at the welding location; overlapping one of the tube ends with the sheath and placing the sheath above the opening in the wall of the vessel for the other tube forming a chamber about the welding location; subsequently pushing the two tube ends toward each other until only a slight intermediate space remains therebetween; subsequently introducing protective gas into the chamber through the intermediate space; and subsequently centering the tubes in a desired position for welding.

7. Method according to claim 6, which comprises forming the sheath of a water-soluble material.

8. Method according to claim 6, which comprises forming the sheath from a plastic film of polyvinyl alcohol.

9. Method according to claim 6, which comprises forming the sheath from a cellulose-polymer combination.

10. Method according to claim 6, which comprises forming the sheath with a substantially cylindrical shape.

11. In combination with a vessel in which two tubes are mutually spaced apart by a given distance, are to be welded together at ends of the tubes, re accessible with difficulty or not at all, and one of which is introduced into the vessel through an opening in a wall of the vessel, an apparatus for forming a chamber for a partial protective-gas atmosphere for the two tubes, comprising:

(a) a sheath:
(b) a tubular basic body for emplacing said sheath, said basic body having a periphery and an outside diameter being smaller than the smallest inside diameter of the too tubes to be welded together; and
(c) a deployment device for said sheath being disposed on the periphery of said basic body.

12. Apparatus according to according to claim 11, wherein:

(a) said tubular basic body has first and second ends, an outer surface, and openings formed therein;
(b) said deployment device includes a longitudinally displaceable adjusting piston disposed axially in said basic body, said adjusting piston having a first end and having a second end with a conical portion;
(c) linear drive means are disposed on said first end of said adjusting piston for actuating said adjusting piston:
(d) latches axially contact said outer surface of said basic body and have a groove formed therein:
(e) cams are radially disposed on said latches and rest upon said conical portion of said adjusting piston through said openings in said basic body; and
(f) springs are annularly disposed on the periphery of said basic body in said groove formed in said latches:

whereby said latches are moved radially outwardly for overlapping the tubes in both axial directions by actuation of said adjusting piston.

13. Apparatus according to according to claim 11, wherein:
(a) said tubular basic body has first and second ends and a longitudinal groove formed therein:
(b) radially outwardly resilient expanding springs are disposed on said first end of said basic body in said longitudinal groove and expand toward said first end;
(c) a tubular adjusting tube longitudinally surrounds said basic body and presses said spreading springs into said longitudinal groove upon longitudinal movement toward said first end of said basic body; and
(d) a tubular positioning tube longitudinally surrounds said adjusting tube.

* * * * *